US006904712B1

(12) United States Patent
Gironda (10) Patent No.: US 6,904,712 B1
(45) Date of Patent: Jun. 14, 2005

(54) VARIABLE WEIGHT DIAMOND JIG FISHING LURE

(76) Inventor: William Gironda, 55 Leonard St., Wading River, NY (US) 11792

( * ) Notice: Subject to any disclaimer, the term of this patent is extended or adjusted under 35 U.S.C. 154(b) by 0 days.

(21) Appl. No.: 10/867,708

(22) Filed: Jun. 16, 2004

(51) Int. Cl.[7] .............................................. A01K 85/00
(52) U.S. Cl. ..................... 43/42.22; 43/42.39; 43/42.35
(58) Field of Search ........................... 43/42.22, 42.39, 43/42.09, 42.35, 42.5, 42.06, 41, 41.2

(56) References Cited

U.S. PATENT DOCUMENTS

| 115,434 | A | * | 5/1871 | Chapman | 43/42.06 |
|---|---|---|---|---|---|
| 849,367 | A | * | 4/1907 | Burke | 43/42.22 |
| 1,569,993 | A | * | 1/1926 | Macleod | 43/42.39 |
| 1,608,375 | A | * | 11/1926 | Dewey | 43/42.35 |
| 1,856,649 | A | * | 5/1932 | Mapel | 43/42.5 |
| 1,913,362 | A | * | 6/1933 | Catarau | 43/42.06 |
| 1,960,488 | A | * | 5/1934 | Gray | 43/42.39 |
| 1,986,282 | A | * | 1/1935 | Parker | 43/42.39 |
| 1,993,798 | A | * | 3/1935 | Peterson | 43/42.09 |
| 2,003,976 | A | * | 6/1935 | Raymond | 43/42.09 |
| 2,065,246 | A | * | 12/1936 | Saarinen | 43/42.5 |
| 2,205,472 | A | * | 6/1940 | Shannon | 43/42.06 |
| 2,302,206 | A | * | 11/1942 | Gibson et al. | 43/41 |
| 2,380,328 | A | * | 7/1945 | Pecher | 43/42.5 |
| 2,487,344 | A | * | 11/1949 | Lambert | 43/41 |
| 2,507,772 | A | * | 5/1950 | Cummins | 43/42.09 |
| 2,535,211 | A | * | 12/1950 | Jelinek | 43/42.5 |
| 2,568,488 | A | * | 9/1951 | Cummins | 43/42.09 |
| 2,632,276 | A | * | 3/1953 | Hale | 43/42.06 |
| 2,633,659 | A | * | 4/1953 | Baum | 43/42.22 |
| 2,644,265 | A | * | 7/1953 | Stettner | 43/42.06 |
| 2,703,947 | A | * | 3/1955 | Petrasek et al. | 43/42.39 |
| 2,706,867 | A | * | 4/1955 | Ayres | 43/42.09 |
| 2,728,160 | A | * | 12/1955 | Franklin | 43/42.09 |
| 2,735,209 | A | * | 2/1956 | Faulkner | 43/42.35 |
| 2,740,224 | A | * | 4/1956 | Heiderich | 43/41 |
| 2,764,834 | A | * | 10/1956 | Klein | 43/42.09 |
| 2,796,693 | A | * | 6/1957 | Gunterman | 43/42.09 |
| 2,909,863 | A | * | 10/1959 | Rector et al. | 43/42.39 |
| 2,914,883 | A | * | 12/1959 | Kustusch | 43/41.2 |
| 3,087,273 | A | * | 4/1963 | Nurme | 43/42.06 |
| 3,169,337 | A | * | 2/1965 | McGregor | 43/42.09 |
| 3,170,263 | A | * | 2/1965 | Purdy | 43/42.41 |
| 3,190,028 | A | * | 6/1965 | Mambrin | 43/41.2 |
| 3,393,466 | A | | 7/1968 | Master | 43/42.35 |
| 3,460,285 | A | * | 8/1969 | Perkins | 43/42.35 |

(Continued)

FOREIGN PATENT DOCUMENTS

JP        2003-325079 B1   * 11/2003

(Continued)

Primary Examiner—Darren W. Ark
(74) Attorney, Agent, or Firm—Richard C. Litman (57) ABSTRACT

The variable weight diamond jig fishing lure has a jig body with an elongated diamond shape, having a greater length than width, with eyes formed into the opposing longitudinal ends for attachment to a fishing line and a fishhook, respectively. The jig body is formed from two symmetrical plates having their central portions stamped, molded, or otherwise formed outward to form a central chamber or cavity for receiving a weight or ballast. Slots are formed in the plates between the cavity and the eye. A lock plate having an eye defined in one end and a lock tab attached by a tang depending from the opposite end are inserted through the slots and rotated to lock opposing ends of the jig body together.

18 Claims, 7 Drawing Sheets

U.S. PATENT DOCUMENTS

| | | | | |
|---|---|---|---|---|
| 3,675,358 A | * | 7/1972 | Jones | 43/42.09 |
| 3,748,772 A | * | 7/1973 | Gravitt | 43/41 |
| 3,913,257 A | * | 10/1975 | Williams, Jr. | 43/42.39 |
| 4,047,317 A | * | 9/1977 | Pfister | 43/42.06 |
| 4,073,084 A | | 2/1978 | Favron | 43/42.35 |
| 4,155,191 A | | 5/1979 | Spivey | 43/42.22 |
| 4,155,192 A | * | 5/1979 | Varaney | 43/42.5 |
| 4,442,622 A | * | 4/1984 | Sartain | 43/42.06 |
| 4,553,348 A | * | 11/1985 | Cooper | 43/42.06 |
| 4,637,160 A | * | 1/1987 | Biskup | 43/42.5 |
| 4,689,914 A | | 9/1987 | Quinlan | 43/42.22 |
| 4,700,503 A | * | 10/1987 | Pippert | 43/42.06 |
| 4,760,664 A | | 8/1988 | Amendola | 43/17.5 |
| 4,777,756 A | * | 10/1988 | Mattison | 43/42.06 |
| 4,800,670 A | * | 1/1989 | Mattison | 43/42.06 |
| 4,839,983 A | * | 6/1989 | Pippert | 43/42.06 |
| 4,918,854 A | | 4/1990 | Webre, Jr. | 43/42.31 |
| 5,036,617 A | | 8/1991 | Waldrip | 43/41 |
| 5,150,538 A | * | 9/1992 | Buchanan | 43/42.39 |
| 5,414,952 A | * | 5/1995 | McLaughlin | 43/42.5 |
| 5,490,346 A | * | 2/1996 | Guest | 43/42.09 |
| 5,648,121 A | * | 7/1997 | Cornell et al. | 43/42.39 |
| 5,862,623 A | * | 1/1999 | MacPherson | 43/42.06 |
| 5,890,315 A | * | 4/1999 | Norton | 43/42.35 |
| 6,079,145 A | | 6/2000 | Barringer | 43/42.06 |
| 6,158,161 A | * | 12/2000 | Rossman | 43/42.06 |
| 6,202,337 B1 | | 3/2001 | Yoshida | 43/42.31 |
| 6,301,823 B1 | * | 10/2001 | Monticello et al. | 43/42.5 |
| 6,349,498 B1 | * | 2/2002 | Garratt | 43/42.06 |
| 6,581,320 B1 | | 6/2003 | Hnizdor | 43/42.39 |
| 6,581,321 B2 | * | 6/2003 | Tashchyan | 43/42.39 |
| 6,606,815 B1 | * | 8/2003 | Toris | 43/42.09 |
| 6,675,525 B1 | | 1/2004 | Ford | 43/42.24 |
| 2002/0174592 A1 | | 11/2002 | Wright | 43/42.36 |
| 2003/0074830 A1 | | 4/2003 | Goeke | 43/42.39 |

FOREIGN PATENT DOCUMENTS

| | | | |
|---|---|---|---|
| JP | 2003-339277 B1 | * | 12/2003 |
| JP | 2004-16156 B1 | * | 1/2004 |

* cited by examiner

VARIABLE WEIGHT DIAMOND JIG FISHING LURE

BACKGROUND OF THE INVENTION

1. Field of the Invention

The present invention relates to fishing lures, and more particularly to a diamond-shaped lure wherein weights for varying the lure's operating depth are easily changed.

2. Description of the Related Art

The diamond jig fishing lure is well known, as it approximates the size and shape of bait fish that would be the primary food source for the type of fish meant to be caught. The diamond jig lure is designed for jig fishing. Jig fishing is essentially fishing at or near the bottom of a body of water using a technique that involves a jiggling retrieve of the lure. Conventional jigs, or jigheads, comprise a lead weight molded onto the shank of a fishhook and painted or dressed to resemble bait in order to attract fish.

The diamond jig, e.g. the Bridgeport diamond jig, is essentially an elongated metal jig having an eye at one end for attachment to a fishing line and a second eye at the opposite end for attachment to a fishhook. The jig has the shape of an enlarged diamond, similar to the diamond suit in a deck of playing cards but elongated on the vertical axis, hence the resemblance to a diamond. The body of the diamond jig has two opposing diamond-shaped faces and two opposing edge faces. The jig may be flat, or may be thicker towards the middle of the jig. In addition, the jig may be rounded at the corners. The diamond jig has a predetermined weight built into the body of the lure to cause the lure to sink to the desired depth and to jig or wobble with the desired motion when the line is retrieved. The diamond jig was originally designed to simulate the appearance and movement of a sand eel. The diamond jig has been used successfully to fish for a wide variety of species of game fish, both in salt water and in fresh water. Diamond jigs are available in a variety of weights that are adapted for the particular game fish of interest. For example, such jigs are commonly available from one ounce up to sixteen ounces in weight, and there are some diamond jigs which weigh up to thirty-two ounces.

A problem that the fisherman has is that this requires a variety of diamond jigs of different weights to adjust to the species of fish and the nature of the water conditions. There is a need for a single diamond jig lure that is weight adjustable so that the weight of the lure can be easily adjusted by adding or subtracting ballast to the lure.

Various schemes have been presented to adjust the buoyancy of various types of fishing lures to take the lure to the desired depth where the target fish are presumed to be swimming. A number of these involve changing the weights internally of the body of the lure.

U.S. Patent Publication No. 2003/0074830, published Apr. 23, 2003, shows a luminescent fishing jig. The jig has a central chamber and a channel extending from the chamber through the body to the exterior. In one embodiment the body is diamond-shaped in cross section. In some embodiments weights can be inserted through the channel to the chamber, the channel then being plugged. In other embodiments weight is added to the lure externally by attaching weight cassettes.

U.S. Pat. No. 6,079,145, issued Jun. 27, 2000 to J. E. Barringer, describes a plastic lure having a cavity accessible through a hinged door or a detachable door. When the door is detachable, it is secured by snaps. The cavity may receive an attractant, weights, or noise-making components. U.S. Pat. No. 5,036,617, issued Aug. 6, 1991 to R. L. Waldrip, discloses a fishing lure having a hollow body of clear plastic with a hinged cap at one end for receiving inserts, such as live or cut bait, noise-makers, or filler). The cap may be retained by a hook and ridge type latch.

U.S. Pat. No. 4,918,854, issued Apr. 24, 1990 to J. B. Webre, Jr., teaches a lure attachment with a hollow conical head and a channel to the hollow interior for inserting B-B's, lead balls, or other noise-makes therein. The channel is sealed by a threaded shaft, such as a threaded eyelet or the threaded shaft of a fishhook. U.S. Pat. No. 4,689,914, issued Sep. 1, 1987 to L. F. Quinlan, describes a lure with a hollow head, a vent sleeve, and a vent plug. The lure is immersed in water, the head is squeezed and then released so that the vacuum draws water into the head to adjust the specific gravity to the desired degree.

Lures which adjust buoyancy by means of a slidable weight are shown in U.S. Pat. No. 4,155,191, issued May 22, 1979 to A. Spivey, and U.S. Pat. No. 6,581,320, issued Jun. 24, 2003 to T. A., Hnizder. Lures with hollow bodies containing weights in which the bodies comprise two halves permanently sealed together are disclosed in U.S. Pat. No. 3,393,466, issued Jul. 23, 1968 to H. A. Master, U.S. Pat. No. 4,073,084, issued Feb. 14, 1978 to S. Favron, and U.S. Pat. No. 6,202,337, issued Mar. 20, 2001 to G. Yoshida.

Fish lures with hollow chambers for other purposes are described in U.S. Pat. No. 4,760,664, issued Aug. 2, 1988 to F. Amendda (first hollow body containing electronic circuitry and second hollow body containing LED) and U.S. Pat. No. 6,675,525, issued Jan. 13, 2004 to J. R. Ford. A lure resembling a diamond jig, but distinguished from the diamond jig by curve-shaped sides and a curved-shaped center that causes the lure to spin faster and move slower when moving downwardly is shown in U.S. Patent Publication Number 2002/0174592, published Nov. 28, 2002. The '592 lure has an axial bore so that the fishing line extends through the lure.

None of the above inventions and patents, taken either singly or in combination, is seen to describe the instant invention as claimed. Thus, a variable weight diamond jig fishing lure solving the aforementioned problems is desired.

SUMMARY OF THE INVENTION

The variable weight diamond jig fishing lure has a jig body with an elongated diamond shape, having a greater length than width, with eyes formed into the opposing longitudinal ends for attachment to a fishing line and a fishhook, respectively. The jig body is formed from two symmetrical plates having their central portions stamped outward to form a central chamber or cavity for receiving a weight or ballast. Slots are formed in the plates between the cavity and the eye. A lock plate having an eye defined in one end and a lock tab attached by a tang depending from the opposite end are inserted through the slots and rotated to lock opposing ends of the jig body together.

The lure may be assembled from the jig using any desired leader and hook configuration. A preferred embodiment includes either a single or a treble fishhook attached to one end by a split ring, and a snap swivel attached to a leader line or directly to the fishing line at the opposite end. The weight placed in the cavity may be any desired weight or sinker (lead balls, BB's, etc.), but is preferably a bank sinker weighing between eight and twenty ounces. The plates comprising the jig body are preferably made from stainless steel, but could also be made from hot or cold rolled steel, copper, brass, plastics, fiberglass, etc. The cavity may be formed by stamping the plates, or by injection molding, cast molding, or other forming process depending upon the material used, and may have any desired external shape, e.g., a fish body with tail fin. The finish on the jig may be bright, natural, plated, painted, or any other finish typically used for fishing lures.

By changing the weight of the sinker in the cavity, the speed at which the lure sinks to the bottom and the degree of wobble upon retrieval of the line can be altered according to the species of game fish and the depth or current condition of the body of water, thereby eliminating the necessity of having separate lures of different weight.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
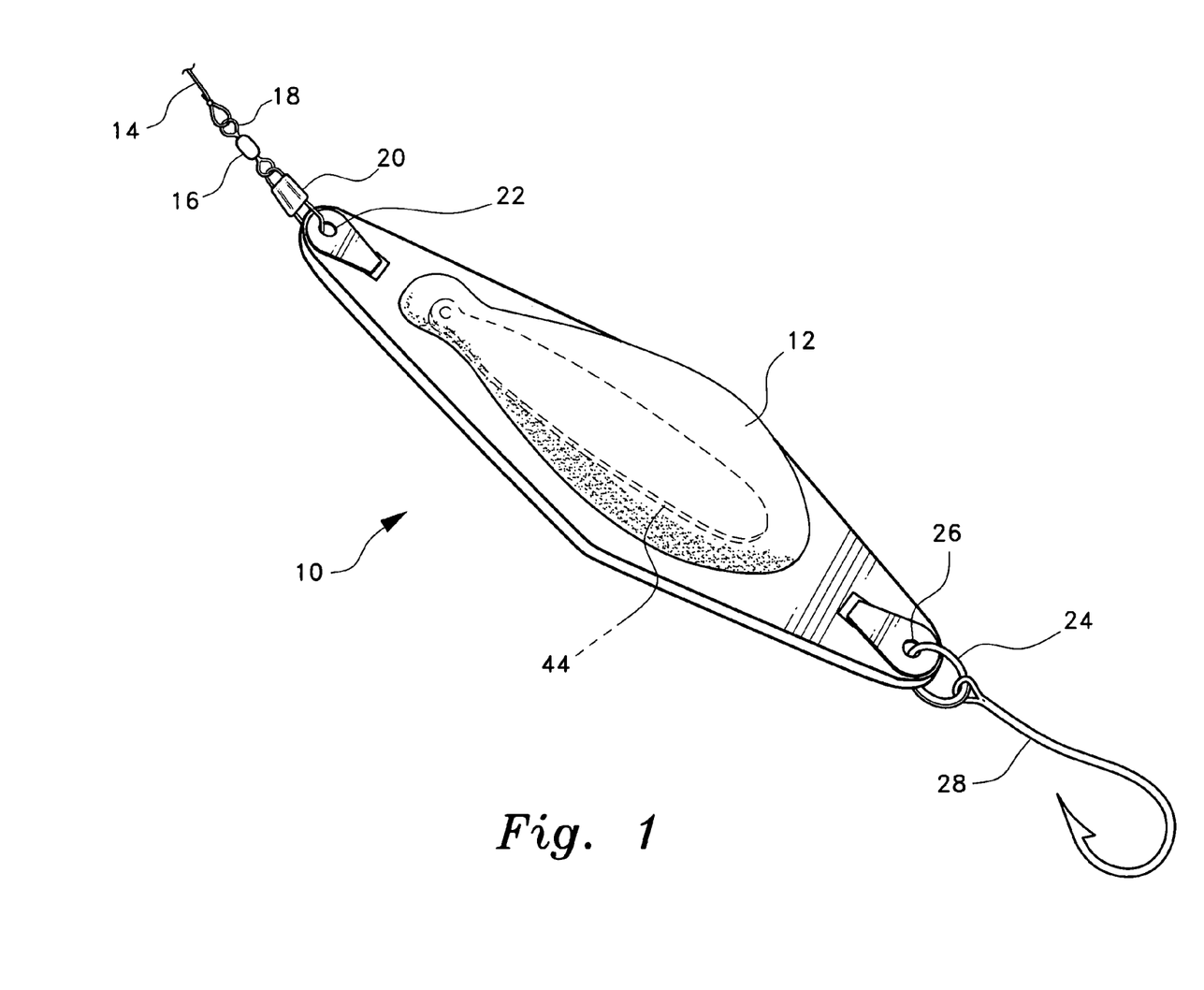
FIG. 1 is a perspective view of a variable weight diamond jig fishing lure according to the present invention.

The present invention is a variable weight diamond fishing lure, designated generally as 10 in FIG. 1. The lure 10 is characterized by a generally diamond-shaped jig body 12 that has a cavity defined therein for receiving a weight or other ballast, in which the body can be opened to replace the weight in order to vary the weight of the lure 10 to adjust the speed at which the weight sinks and the degree of wobble during retrieval of the lure according to the type of game fish targeted, and according to the depth, bottom conditions, current, and other environmental factors relating to the waters being fished.

The jig body 12 is elongated and has a first end adapted for attachment to a fishing line and a second end adapted for attachment to a fishhook. The lure may be assembled from the jig using any desired terminal tackle, including any desired leader and hook configuration. A preferred embodiment includes either a single or a treble fishhook attached to one end by a split ring, and a snap swivel attached to a leader line or directly to the fishing line at the opposite end. For example, FIG. 1 shows a fishing line 14 attached to a snap swivel 16, the line 14 being inserted through the swivel ring 18 and secured thereto by a knot, crimp, or other conventional means. The snap end 20 of the swivel 16 is inserted through an eye 22 formed in the end of the jig body 12, as described below. A stainless steel split ring 24, a snap lock clip, or other connector is inserted through a second eye 26 formed in the opposite end of the jig body 12, and a single fishhook 28 is secured to the ring 24 by inserting the split ring 24 or snap lock clip through the eye in the shank of the fishhook 28.

Figure 2A:
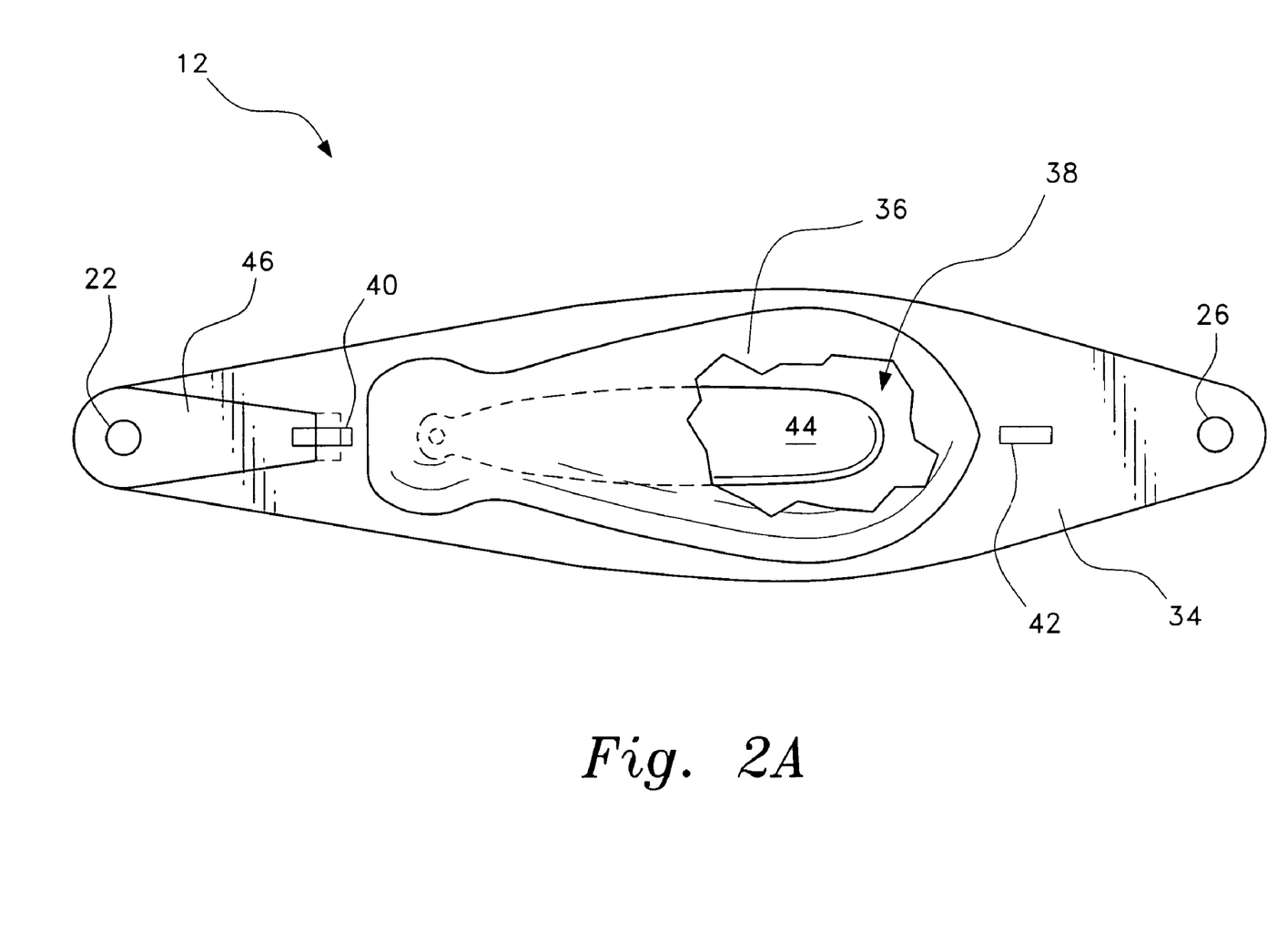
FIG. 2A is a plan view of a variable weight diamond jig according to the present invention, the outer shell being partially broken away to show the weight in the cavity and a lock clip being omitted from the hook end of the jig.
Figure 3:
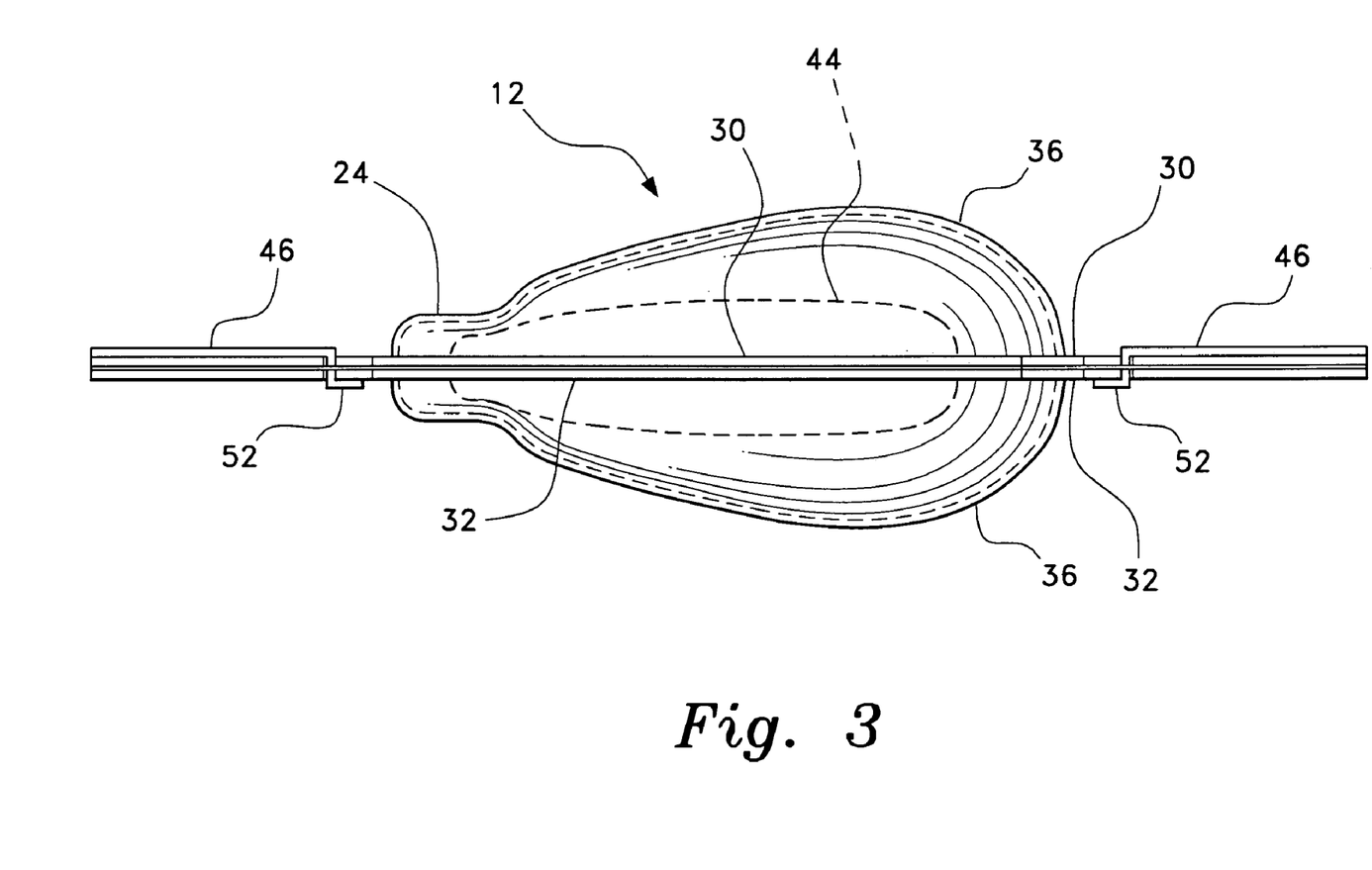
FIG. 3 is a side view of the invention of the variable weight diamond jig according to the present invention with both lock clips locked into place.

Referring to FIGS. 2A and 3, the jig body 12 made from two symmetrical plates 30 and 32, each plate having an elongated diamond shape with a flat periphery 34 and a half-shell central portion 36 defining a chamber or cavity 38. The central portion 36 may have the general outline of a fish. As noted above, the flat periphery 34 has eyes 22 and 26 defined in opposite ends of the plates 30 and 32. Each plate 30 and 32 also has a first elongate slot 40 defined therein between eye 22 and central portion 36, and a second elongate slot 42 defined between central portion 36 and eye 26.

The plates 30 and 32 are preferably made from stainless steel, but could also be made from hot or cold rolled steel, copper, brass, plastics, fiberglass, etc. The half-shell central portions 36 defining the cavity 38 may be formed by stamping the plates 30 and 32, by casting the plates in a mold, by injection molding, or by other processes. Representative dimensions for the plates 30 and 32 may include an overall length of about eight inches and a width at the center of about two inches. The central portion 36 defining the cavity 38 may have an overall length of about 4⅛", a width of about 1⅝" at its broadest point and ⅞" at the "tail" of the fish-shaped cavity 38, and a maximum height or depth of about 1" in each half-shell 36, and a height or depth in the fish "tail" portion of the cavity of about ¼", the fish tail portion being about ¾" long. The ends of the central portion 36 are about 1¹⁵⁄₁₆ inches from the ends of the plates 3 26 may have a diameter of about ¼", the slots 40 and 42 having a length of about ⅜" and a width of about ⅛". It will be understood that the above dimensions are only representative dimensions, and actual dimensions may vary.

A ballast or weight is disposed within the cavity 38. The weight placed in the cavity may be any desired weight or sinker (lead balls, BB's, etc.), but is preferably a bank sinker 44, as shown in FIGS. 2A and 3. The bank sinker 44 preferably weighs between eight and twenty ounces. Although a plurality of discrete weights could be used, the plurality of weights may have a tendency to shift around and become separated at opposite ends and sides of the cavity, affecting the wobbling motion of the lure 10 during retrieval. Bank sinkers generally have an hourglass shape, and are commonly available in one ounce increments in the desired range from eight to twenty ounces, making adjusting the weight of the jig 12 a simple matter of removing a single weight and replacing it with a single weight. Also, the shape of the bank sinker 44 places the center of gravity towards the hook end of the lure 10 to promote rapid descent to the bottom, and imparting a desired wobble to the swivel 16 upon jigging or retrieving the line 14.

Figure 2B:
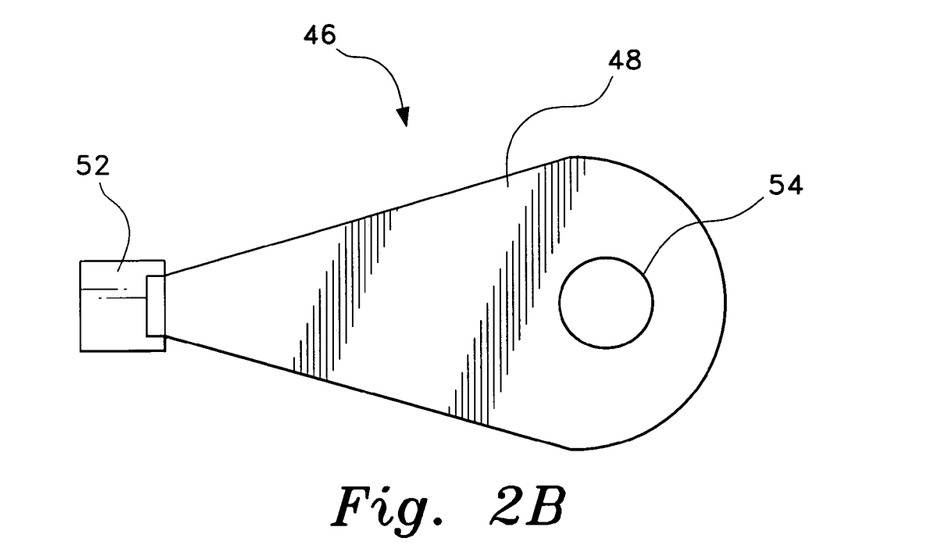
FIG. 2B is a plan view of a lock clip used for the variable weight diamond jig according to the present invention.
Figure 2C:
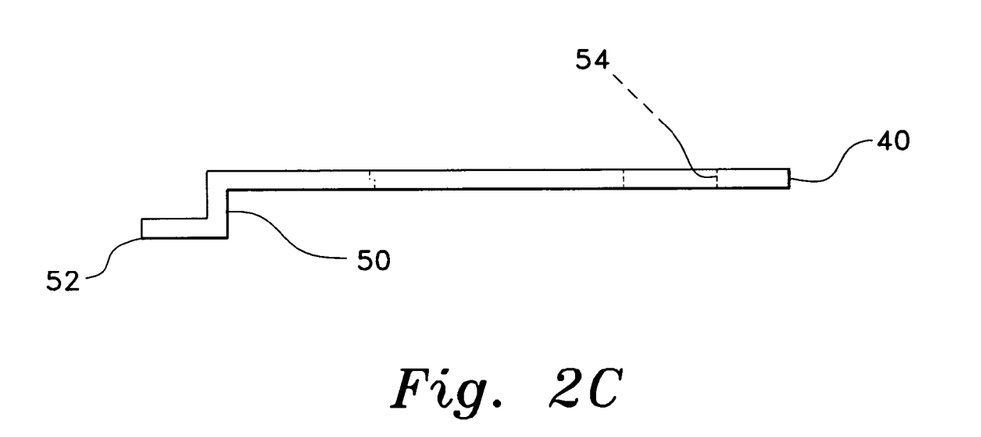
FIG. 2C is a side view of a lock clip used for the variable weight diamond jig according to the present invention.

The diamond jig 12 includes a pair of lock clips 46, shown in FIGS. 2B and 2C, for releasably locking the plates 30 and 32 together. Each clip 46 has a flat, teardrop shaped body 48, a tang 50 depending or projecting downwardly from the body 48 at an angle of about 90°, and a rectangular tab 52 extending from the tang 50 at an angle of about 90°, the tab 52 being parallel to the body 48 but extending 180° opposite the body 48. There may be a fillet at the junctions between body 48 and tang 50, and between tang 50 and tab 52, in order to ease assembly of the jig 12, or tang 50 may be slightly canted away from body 48 and tab 52 for the same purpose. Each clip 46 has an eye 54 defined therein opposite the tang, the eye 54 having the same diameter as eyes 22 and 26. Each tab 52 has a width slightly smaller than the length of the slots 40 and 42, and a thickness slightly smaller than the width of slots 40 and 42. Each tang 50 has a thickness and a width slightly less than the width of slots 40 and 42, and a length slightly greater than the combined thickness of plates 30 and 32.

Figure 2D:
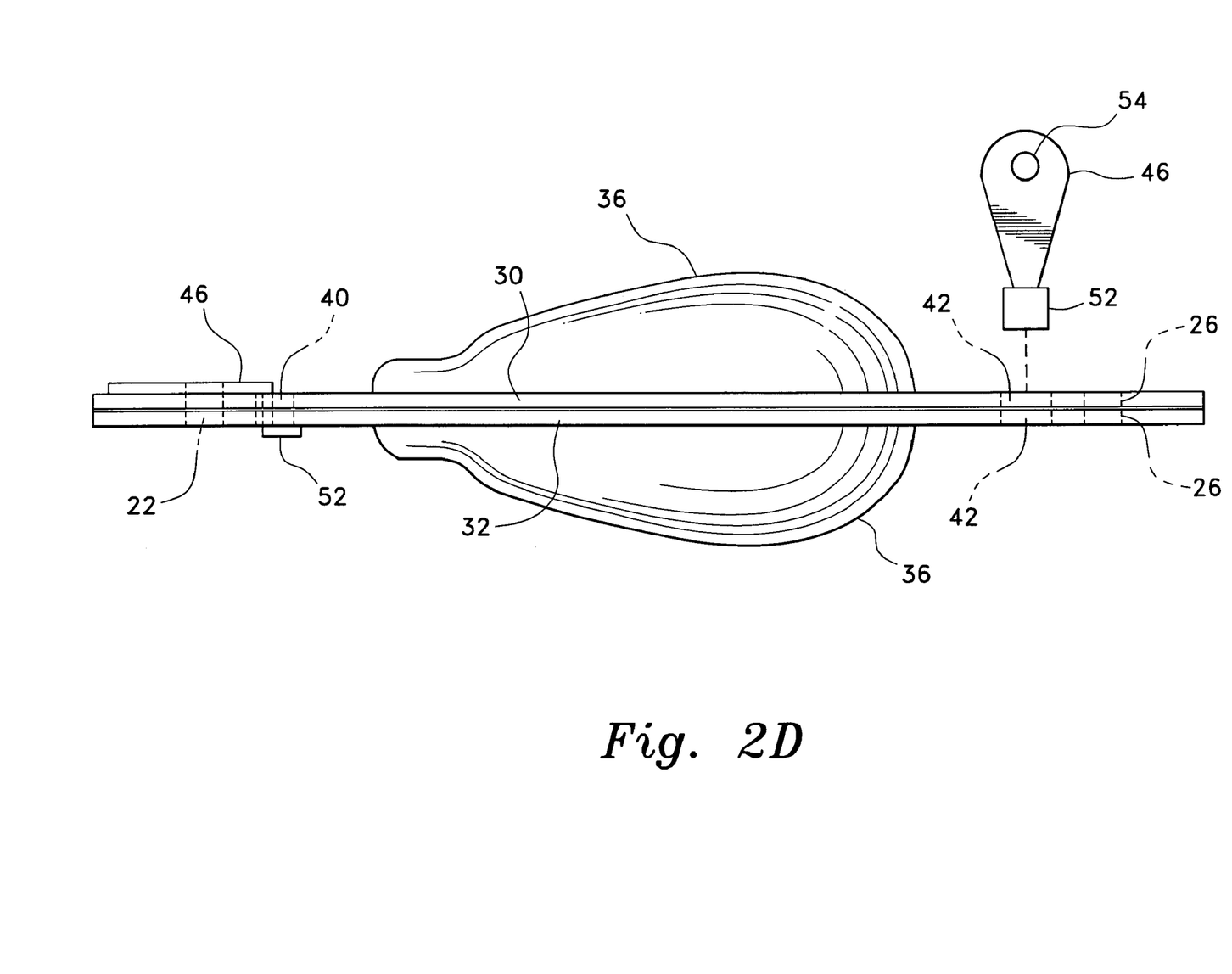
FIG. 2D is an exploded elevation view showing the process of inserting the lock clip into the variable weight diamond jig according to the present invention.
Figure 2E:
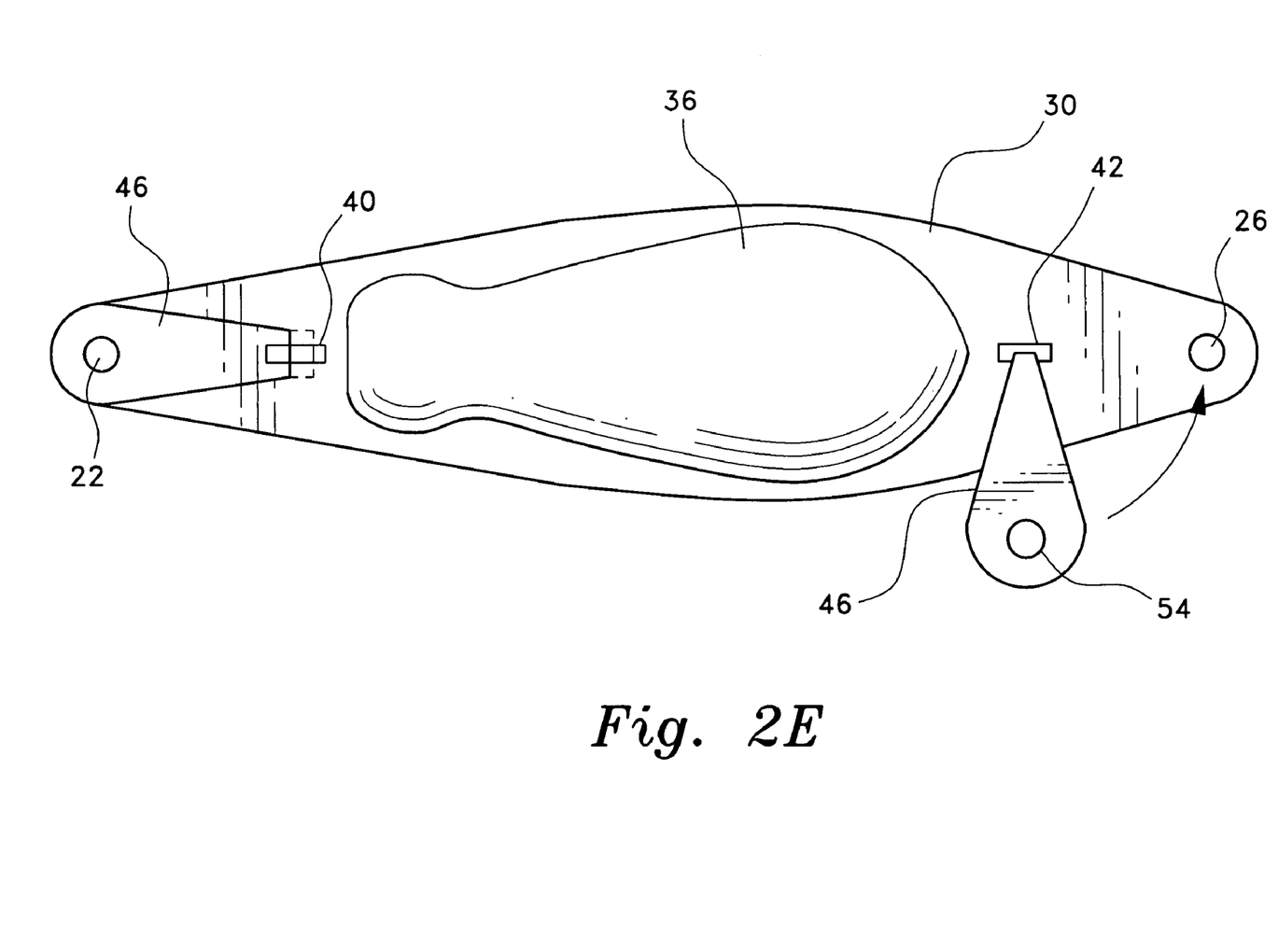
FIG. 2E is a plan view of the variable weight diamond jig according to the present invention with the lock clip tab inserted into the slot, but before rotation of the lock clip.
Figure 4:
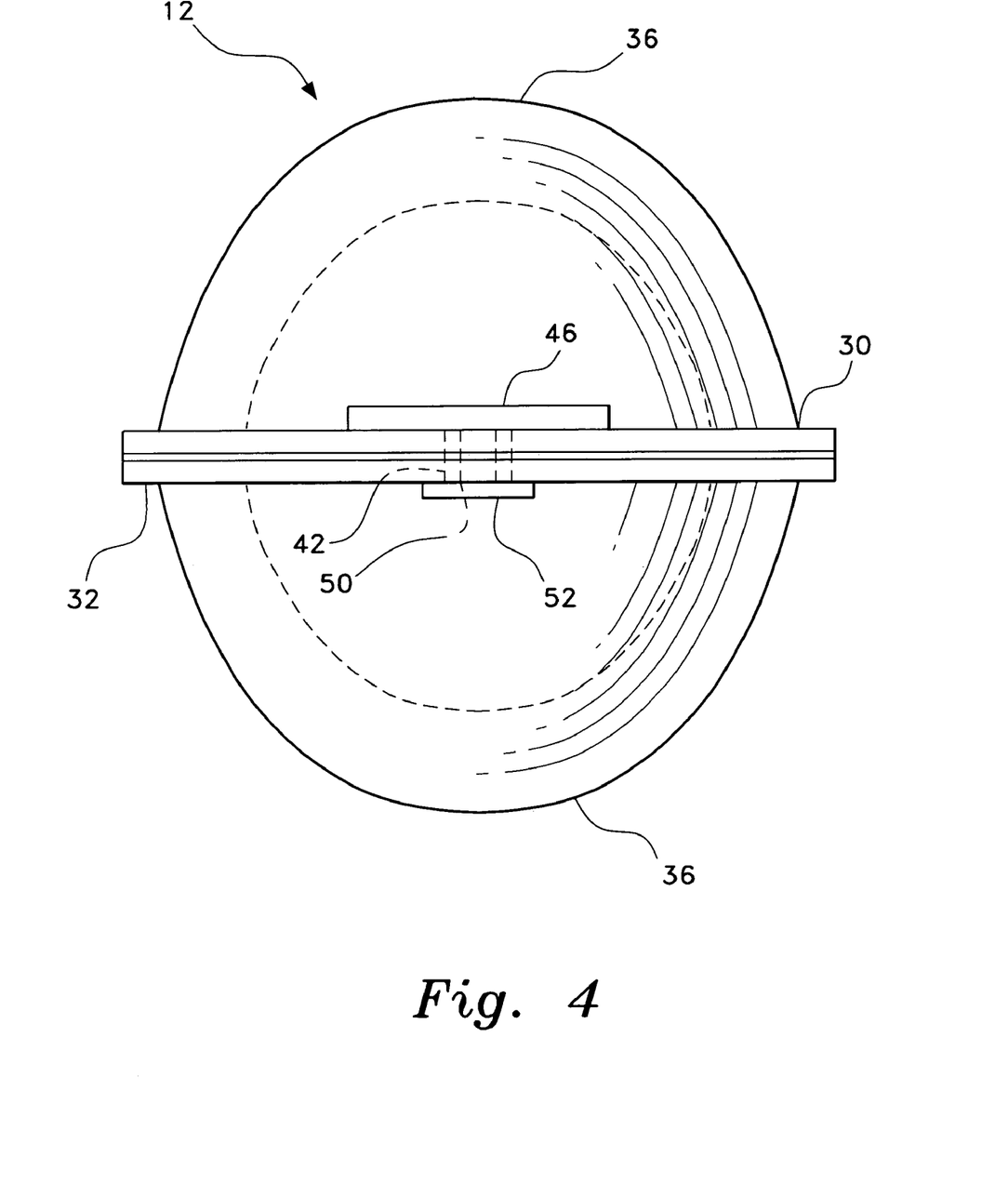
FIG. 4 is an end view of the variable weight diamond jig according to the present invention.

As shown in FIGS. 2D and 2E, the plates 30 and 32 are abutted together so that central portions 36 form cavity 38, the eyes 22 and 26 and slots 40 and 42 of the two plates 30 and 32 being in registry. The clip 46 is oriented perpendicular to the plates 30 and 32 so that the leading edge of the tab 52 is aligned with the slot 40 or 42 and inserted therethrough and the clip 46 is rotated vertically 90° until body 48 is parallel with plates 30 and 32, tab 52 is under and parallel to plate 32, and tang 50 extends through the slot 40 or 42. Clip 46 is then rotated 90° horizontally to align eye 54 with either eye 22 or eye 26. As shown in FIGS. 3 and 4, plates 30 and 32 are then clamped together between the clip body 48 and tab 52.

When it is desired to vary the weight of the diamond jig 12, the clip 46 is rotated 90° horizontally and again 900 vertically, and tab 52 is removed from slot 40 or 42. After both lock clips 46 have been removed, the bank sinker 44 is removed and replaced with a bank sinker 44 of the desired weight, and the lock clips are reinstalled. Hence the variable weight diamond jig 12 and lure 10 of the present invention provide the fishermen with a single diamond lure whose weight can be varied quickly and easily to adjust to the desired species of game fish and the conditions of the body of water being fished.

It is to be understood that the present invention is not limited to the embodiment described above, but encompasses any and all embodiments within the scope of the following claims.

I claim:

1. A variable weight diamond jig, comprising:
   first and second symmetrical plates, each of the plates having an elongated diamond shape and opposing longitudinal ends, each of the plates having a flat periphery and a central portion defining a half-shell, the two half-shells defining a cavity when the two plates are abutted and in registry, each of the plates having a first eye and a second eye disposed in the opposing ends, each of the plates having a first elongate slot defined in the flat periphery between the first eye and the central portion and a second elongate slot defined in the flat periphery between the central portion and the second eye;
   a first lock clip and a second lock clip removably inserted in the first and second slots, respectively, each of the lock clips having a flat body and a tab parallel to the body, the flat periphery of the first and second plates being locked together in abutting relation between the body and the tab of each of the lock clips in a locked position in order to define the cavity; and
   a ballast disposed within the cavity.

2. The variable weight diamond jig according to claim 1, wherein each of said lock clips has a teardrop shape defining a broad arcuate end and a tapered narrow end, the arcuate end having an eye defined therein in registry with the eyes defined in the opposing ends of the first and second plates, respectively, when said clips are in the locked position.

3. The variable weight diamond jig according to claim 2, wherein each of said lock clips comprises a tang depending from the narrow end, the tab extending from the tang in a direction opposite the body, the tang having a width narrower than the first and second slots and a length greater than the combined thickness of the first and second plates, whereby the tabs of the lock clips are inserted through the aligned first slots and aligned second slots, respectively, to place the tabs and the lock clip bodies on opposites sides of the first and second plates, the tangs extending through the slots, and said lock clips are rotated to align the eyes in the lock clips with the eyes in the plates, thereby locking the first and second plates together.

4. The variable weight diamond jig according to claim 1, wherein said ballast comprises a bank sinker.

5. The variable weight diamond jig according to claim 1, wherein said ballast weighs between eight ounces and twenty ounces.

6. The variable weight diamond jig according to claim 1, wherein said half-shells define a fish shape including a wide and deep head and body, and a narrow and shallow tail, the flat periphery surrounding the fish-shaped half-shells.

7. The variable weight diamond jig according to claim 1, according to claim 1, wherein said first and second plates are made from a material selected from the group consisting of stainless steel, hot rolled steel, cold rolled steel, copper, brass, plastic, and fiberglass.

8. A variable weight diamond jig fishing lure, comprising:
   (a) a diamond-shaped jig having:
      (i) first and second symmetrical plates, each of the plates having an elongated diamond shape and opposing longitudinal ends, each of the plates having a flat periphery and a central portion defining a half-shell, the two half-shells defining a cavity when the two plates are abutted and in registry, each of the plates having a first eye and a second eye disposed in the opposing ends, each of the plates having a first elongate slot defined in the flat periphery between the first eye and the central portion and a second elongate slot defined in the flat periphery between the central portion and the second eye;
      (ii) a first lock clip and a second lock clip removably inserted in the first and second slots, respectively, each of the lock clips having a flat body and a tab parallel to the body, the flat periphery of the first and second plates being locked together in abutting relation between the body and the tab of each of the lock clips in a locked position in order to define the cavity; and
      (iii) a ballast disposed within the cavity;
   (b) a snap swivel attached to the first eyes, the snap swivel being adapted for attachment to a fishing line; and
   (c) a fishhook attached to the second eyes.

9. The variable weight diamond jig fishing lure according to claim 8, further comprising a split ring attaching said fishhook to the second eyes of said jig.

10. The variable weight diamond jig fishing lure according to claim 8, further comprising a snap lock clip attaching said fishhook to the second eyes of said jig.

11. The variable weight diamond jig fishing lure according to claim 8, wherein said fishhook comprises a single hook.

12. The variable weight diamond jig fishing lure according to claim 8, wherein said fishhook comprises a treble hook.

13. The variable weight diamond jig fishing lure according to claim 8, wherein each of said lock clips has a teardrop shape defining a broad arcuate end and a tapered narrow end, the arcuate end having an eye defined therein in registry with the eyes defined in the opposing ends of the first and second plates, respectively, when said clips are in the locked position.

14. The variable weight diamond jig fishing lure according to claim 13, wherein each of said lock clips comprises a tang depending from the narrow end, the tab extending from the tang in a direction opposite the body, the tang having a width narrower than the first and second slots and a length greater than the combined thickness of the first and second plates, whereby the tabs of the lock clips are inserted through the aligned first slots and aligned second slots, respectively, to place the tabs and the lock clip bodies on opposites sides of the first and second plates, the tangs extending through the slots, and said lock clips are rotated to align the eyes in the lock clips with the eyes in the plates, thereby locking the first and second plates together.

15. The variable weight diamond jig fishing lure according to claim 8, wherein said ballast comprises a bank sinker.

16. The variable weight diamond jig fishing lure according to claim 8, wherein said ballast weighs between eight ounces and twenty ounces.

17. The variable weight diamond jig fishing lure according to claim 8, wherein said half-shells define a fish shape including a wide and deep head and body, and a narrow and shallow tail, the flat periphery surrounding the fish-shaped half-shells.

18. The variable weight diamond jig fishing lure according to claim 8, wherein said first and second plates are made a material selected from the group consisting of stainless steel, hot rolled steel, cold rolled steel, copper, brass, plastic, and fiberglass.

* * * * *